United States Patent
Maerkl et al.

(10) Patent No.: US 8,727,093 B2
(45) Date of Patent: May 20, 2014

(54) METHOD AND DEVICE FOR TRANSMISSION NOISE SUPPRESSION

(75) Inventors: Johann Maerkl, Ingolstadt (DE); Alexander Schmidt, Ingolstadt (DE)

(73) Assignee: Audi AG, Ingolstadt (DE)

( * ) Notice: Subject to any disclaimer, the term of this patent is extended or adjusted under 35 U.S.C. 154(b) by 1075 days.

(21) Appl. No.: 12/501,531

(22) Filed: Jul. 13, 2009

(65) Prior Publication Data

US 2010/0018828 A1   Jan. 28, 2010

(30) Foreign Application Priority Data

Jul. 11, 2008  (DE) .................. 10 2008 032 757

(51) Int. Cl.
*F16D 13/72*   (2006.01)

(52) U.S. Cl.
USPC ..................................... 192/70.12

(58) Field of Classification Search
USPC ............... 192/11.35, 30 V, 48.8, 48.9, 48.91, 192/113.34, 70.12; 74/467; 477/70, 72, 76, 477/79, 166, 168, 174, 180
See application file for complete search history.

(56) References Cited

U.S. PATENT DOCUMENTS

| 7,395,908 | B2 * | 7/2008 | Hegerath et al. | 192/3.58 |
| 7,401,689 | B2 * | 7/2008 | Hegerath et al. | 192/3.58 |
| 7,775,335 | B2 * | 8/2010 | Maienschein et al. | 192/3.29 |
| 8,087,506 | B2 * | 1/2012 | Haupt | 192/85.61 |
| 2002/0119865 | A1 * | 8/2002 | Fukumoto et al. | 477/174 |
| 2008/0236978 | A1 * | 10/2008 | Kummer | 192/48.1 |

FOREIGN PATENT DOCUMENTS

| DE | 102006008207 A1 | 9/2006 |
| DE | 602005000435   | 5/2007 |
| DE | 102006044273 A1 | 4/2008 |

* cited by examiner

*Primary Examiner* — David D Le
*Assistant Examiner* — David J Hlavka
(74) *Attorney, Agent, or Firm* — Novak Druce Connolly Bove + Quigg LLP

(57) ABSTRACT

The invention relates to a method and a device for suppressing transmission noise from automatic transmissions, in particular for motor vehicles, the transmission having at least two alternating multi-disk clutches that control a power flow via a gearing mechanism through which oil flows to cool the clutches and to reduce wear and tear on them. To create a method and a device that are of simple design and that can operate without wear and tear, it is proposed that under defined operating conditions of the transmission, the throughput amount of oil is increased in such a way that a defined drag torque occurs at the multi-disk clutch that is opened.

7 Claims, 1 Drawing Sheet

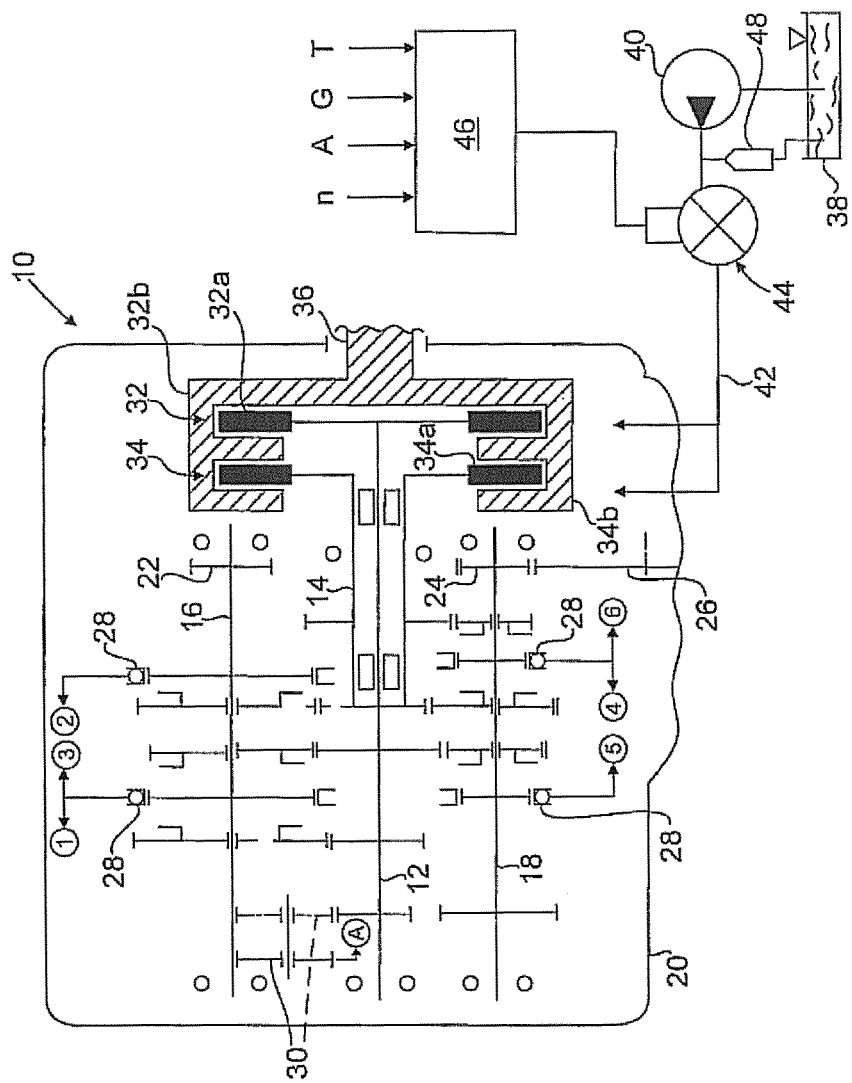

METHOD AND DEVICE FOR TRANSMISSION NOISE SUPPRESSION

CROSS REFERENCE TO RELATED APPLICATIONS

This application claims priority from German Patent Application No. 10 2008 032 757.3filed Jul. 11, 2008.

The invention relates to a method and a device for the suppression of transmission noise from automatic transmissions, in particular in motor vehicles.

BACKGROUND OF THE INVENTION

Such a method is described in EP 1 617 108 B1, which proposes activating one of the two multi-disk clutches that control the drive flows in a state of skidding in which it transfers a drag torque to suppress transmission noise or gear rattle. It is thus achieved that in certain operating states of the transmission, gears that are idle or that are not transferring any load are damped, i.e., do not produce any tooth flank noise excited by torsional vibrations. Activating the multi-disk clutch, which is opened in each case, into the skid state, however, unavoidably produces elevated clutch wear.

The object of the invention is to propose a method of the generic type that can be implemented with relatively simple means and does not cause any elevated clutch wear. Furthermore, an advantageous device for implementing the method is indicated.

SUMMARY OF THE INVENTION

According to the invention, it is proposed that under defined operating conditions of the transmission, the throughput amount of oil is increased in such a way that a defined drag torque occurs at the multi-disk clutch that is opened. Consequently, the clutch control is not used, but rather the throughput amount of cooling oil is correspondingly increased. In this case, the oil within the air gap of the multi-disk clutch, similar to a visco clutch, produces an increasing torque, which is sufficient to damp the tooth flank play or to eliminate rattling or transmission noises. In this case, no additional wear occurs at the respective multi-disk clutch.

The throughput amount of oil can be increased advantageously for the transmission noise that occurs, whereby the transmission noise can be detected via a corresponding acoustic sensor, e.g., at the gearbox.

In addition, the throughput amount of oil can be controlled in addition or as an alternative based on the temperature of the oil. In this case, it is taken into consideration that transmission noise multiplies at elevated oil temperatures, in which the cooling oil or hydraulic fluid has a reduced viscosity.

Furthermore, the throughput amount of oil can be controlled in addition or as an alternative based on the gear-shift position. This is based on the knowledge that under certain operating conditions, e.g., with elevated driving speeds of the motor vehicle, such transmission noise no longer occurs or it is not audible.

The throughput amount of oil can preferably be controlled via a timed control valve and thus makes it possible, e.g., to increase the throughput amount only to the extent that is exactly necessary for suppressing the temporarily prevailing transmission noise.

In an especially advantageous way, in a double-clutch gear with input shafts and two output shafts, and with two wet-running multi-disk clutches that act on the two output shafts via switchable synchronizer clutches, the throughput amount of oil can be increased at least for the respective open multi-disk clutch that is not activated.

In a preferred device for executing the method on a double-clutch gear with a pressure medium source that supplies the multi-disk clutch, it is proposed that at least one control valve, which can be switched via an electronic control device based on signals from an acoustic sensor and/or a temperature sensor and/or a gear-shift position sensor and/or a speed sensor of one of the gear shafts or the driving engine into a valve position that increases the throughput amount of oil, is activated in the supply lines to the multi-disk clutches. In this case, the control valve for setting exact throughput amounts of oil can be an electrically activated timing valve.

In addition to or as an alternative to the above embodiment, the rattle or transmission noises can be eliminated by activating a synchronizer clutch, which can be engaged in a known way to switch gears with loose gears. Activating the synchronizer clutch accordingly provides a desynchronization of the selector gears, preferably most inclined to rattle.

The synchronizer clutch can be power-controlled or motion-controlled or adjusted or acoustically activated. By way of example, with an automatic stepped gear with usually four shifting groups that can be activated individually, a maximum of three gears can thus be damped with the gear selected. Alternatively, with a double-clutch gear, two more gears in addition to the set and preselected gear can generally be damped by the synchronization system.

In another embodiment, the rattle or transmission noise can be avoided by a corresponding activation of the clutch of a preselected gear. In this case, the clutch can be applied so that the rattle is stopped. The activation or adjusting of the clutch can be carried out based on the gear, the speed, the torque, or the oil temperature. The adjustment of the clutch is carried out by means of an acoustic or rattle sensor, or the like.

The clutch can be applied temporarily and/or based on assessment of the accompanying deterioration of efficiency. In addition, the degree of the application of the clutch can be adapted to the specific motor vehicle or use or can be adjusted to what is comfortable. Optionally, based on the invention, a two-mass flywheel can be omitted, thereby saving weight, installation space, or cost.

BRIEF DESCRIPTION OF THE DRAWING

FIG. 1 of the drawing, shows in a rough diagram form a double-clutch gear for motor vehicles with a device for suppressing transmission noise.

DETAILED DESCRIPTION OF THE PREFERRED EMBODIMENT OF THE INVENTION

In the drawing, a double-clutch gear for motor vehicles, which is essentially composed of two input shafts 12, 14 and two output shafts 16, 18, which are mounted to rotate in a gearbox 20, is designated as 10. As is evident, the input shaft 14 is a hollow shaft that is mounted to rotate on the input shaft 12. The two output shafts 16, 18 mesh via stationary gears 22, 24 with a gear 26 of a differential gear, not shown.

Between the input shafts 12, 14 and the output shafts 16, 18, undesignated stationary gears and loose gears that can be switched by synchronizer clutches 28, which define the gears 1 to 6 and a reverse gear R in the activated state, are provided conventionally. For the reverse gear R, a corresponding reversing gear 30 is provided conventionally.

The two input shafts 12, 14 of the transmission 10 can be coupled via wet-running multi-disk clutches 32, 34 in an alternating way with the driving internal combustion engine or its crankshaft 36 (only indicated). The multi-disk clutches 32, 34 are of a known, if not described, design; this also applies to their hydraulic actuation and electronic control.

For cooling and wear reduction, the multi-disk clutches 32, 34 are connected conventionally to an oil circulation system, in which hydraulic fluid is suctioned off from an oil pan 38 and conveyed to the multi-disk clutches 32, 34 with a feed pump 40 via respective lines 42 as indicated. From there, the oil flows back again with zero pressure into the lubricating oil pan 38. Downstream from the feed pump 40, an overpressure valve 48 is switched into the lines 42.

It goes without saying that this oil circulation system 38, 40, 42, 48, if described, is integrated conventionally into the transmission 10, the oil being fed centrally via the input shafts 12, 14 and flowing back again into the oil pan 38 of the gearbox 20 by radial grooves in the multi-disk clutches 32a, 34a and via outflow openings in the clutch housings 32b, 34b (or a standard clutch housing).

In the lines 42 (these can also be conduits integrated into gear parts), an electromagnetic timing valve 44 is activated, which is controlled via an electronic control device 46 in its clock frequency and thus changes the throughput of oil to the wet-running multi-disk clutches 32, 34.

The electronic control valve 46 is control-connected to sensors, not shown, that emit a speed signal n from one of the output shafts 16 or 18, a defined signal A of an acoustic sensor indicating transmission noise, a gear-shift position signal G, and a temperature signal T of the temperature of the cooling oil, which signals are logically linked in the control device 46.

Normally (no transmission noise), the two multi-disk clutches 32, 34 are provided in the usual way with cooling oil to an extent in which no drag torque occurs in the multi-disk clutch or in two multi-disk clutches 32, 34 that is/are opened. This is necessary so that said synchronizer clutches 28 can be actuated without interference for switching and preselecting gears.

If, with the gear engaged (e.g., in first gear) and the multi-disk clutch 32 closed, transmission noise or so-called gear rattle occurs in the idle-rotating gears because of the Ferraria effect or torsional vibrations in the drive system, this is detected via the electrical signal A of the acoustic sensor, and via the timing valve 44, the control device 46 increases the throughput amount of cooling oil to the multi-disk clutches 32, 34 such that a drag torque produced by shear friction of the cooling oil occurs in the multi-disk clutch 34 that is opened.

As an alternative or in addition, the control device 46 can activate the synchronizer clutches 28 so that at least the control gears that are most inclined to rattle can be desynchronized.

The drag torque that is generated by increasing the throughput amount of oil produces an effective suppression of transmission noise by ensuring that it applies the corresponding tooth flanks of the gears on the output shaft 18 that are engaged and the corresponding gears on the input shaft 14 to one another or by eliminating tooth flank play.

The control device 46 upholds this drag torque over the timing valve 44 until a gear change is detected via the gear-shift position signal G, e.g., in the already preselected 2nd gear. To this end, the multi-disk clutches 32, 34 are switched so that the multi-disk clutch 34 is now closed and the multi-disk clutch 32 is open. If, in turn, transmission noise occurs after this gear change, the throughput amount of cooling oil is again increased, as described above, and said drag torque on the multi-disk clutch 32 is increased.

This process can be repeated both with upshifting processes and with reverse shifting processes and with reverse gears. In higher gears (e.g., 5th and 6th gears), the placement of a drag torque on the multi-disk clutches 32, 34 is completely suppressed.

The same applies when it is detected via the temperature sensor or via the signal T that the cooling oil is relatively cold, since even then, as a rule, no transmission noise occurs; in addition, via the temperature signal T, in the case of excessive temperatures of the cooling oil with high power transfer of the transmission 10, the cooling oil throughput can be temporarily increased by the control device 46 activating the timing valve 44 accordingly.

The invention is not limited to the embodiment that is shown. Thus, optionally, the multi-disk clutches 32, 34 can also be activated separately, so that in each case, an increased cooling oil throughput is applied only to the multi-disk clutch 32 or 34 that is opened. This can be executed by means of, e.g., a suitable, electromagnetically-controlled control valve.

Instead of the sensor signals n, A, G, and T that are described, fewer sensors can also be used, in particular when the operating conditions under which the disruptive transmission noise optionally occurs regularly are known by empirical tests. In this case, these operating conditions (e.g., driving in 1st and 2nd gears and in reverse gear) can be programmed directly into the control device 46 and processed accordingly.

Moreover, the invention can be applied over and over again wherever at least two wet-running multi-disk clutches are used, e.g., even in automatic gears with carrier pinions.

The invention claimed is:

1. A method for suppressing transmission noise from automatic transmissions for motor vehicles, the transmission having a multi-disk clutch, the method comprising
    an electronic control device receiving one or more signals from at least one selected from the group consisting of an acoustic sensor, a gear-shift position sensor, a speed sensor, and combinations thereof;
    in response to the one or more signals, activating, by the electronic control device, at least one control valve to increase a throughput amount of cooling oil to an air gap of the multi-disk clutch; and
    thereby producing increased drag torque sufficient to suppress transmission noise.

2. The method according to claim 1,
    wherein the one or more signals include a signal from the acoustic sensor, indicating an increase in transmission noise, and
    wherein the throughput amount of oil is increased in response to the signal from the acoustic sensor, indicating an increase in transmission noise.

3. The method according to claim 1,
    wherein the one or more signals include a signal from the gear-shift position sensor, which indicates a qear-shift position of the transmission, and
    wherein the throughput amount of oil is controlled in response to the signal from the gear-shift position sensor, which indicates a gear-shift position of the transmission.

4. The method according to claim 1, wherein the control valve is a timed control valve.

5. The method according to claim 1, wherein in a double-clutch gear with two input shafts and two output shafts and two wet-running multi-disk clutches that act on the two output shafts via switchable synchronizer clutches, the throughput amount of oil is increased at least for the open multi-disk clutch that is not activated in each case.

6. The method, for suppressing transmission noise from automatic transmissions according to claim 1, wherein when transmission noise occurs, a synchronizer clutch of the transmission is activated, by which control gears, in particular the control gears that are most inclined to rattle, are desynchronized.

7. The method according claim 1 for suppressing transmission noise from automatic transmissions, wherein when transmission noise occurs, a clutch of a preselected gear is applied so that rattling is avoided.

\* \* \* \* \*